(No Model.)
W. W. FLEWELLING.
HUB AND AXLE.
No. 463,272.          Patented Nov. 17, 1891.
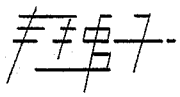
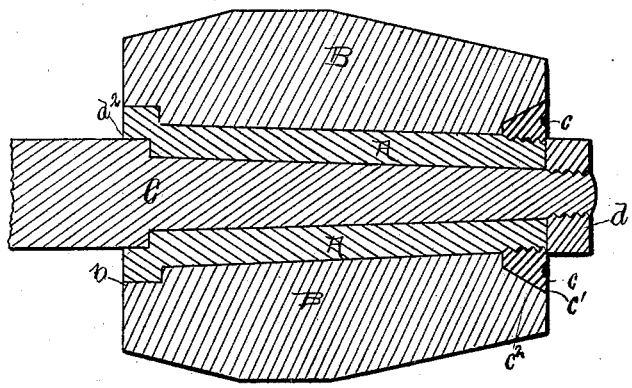
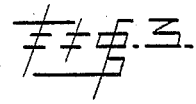
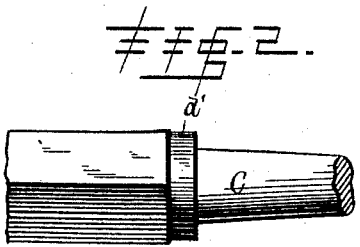
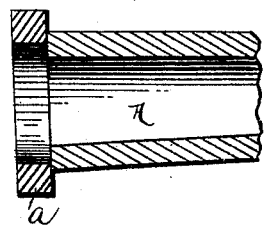
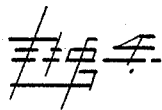
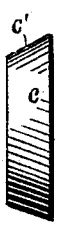
WITNESSES
W. E. Bowen
J. K. Hagmann
INVENTOR
William W. Flewelling
By Myers & Co.
Attorneys.
THE NORRIS PETERS CO., PHOTO-LITHO., WASHINGTON, D. C.

UNITED STATES PATENT OFFICE.

WILLIAM W. FLEWELLING, OF KINGSBURG, CALIFORNIA.

HUB AND AXLE.

SPECIFICATION forming part of Letters Patent No. 463,272, dated November 17, 1891.

Application filed May 7, 1891. Serial No. 391,891. (No model.)

*To all whom it may concern:*

Be it known that I, WILLIAM W. FLEWELLING, a citizen of the United States of America, residing at Kingsburg, in the county of Fresno and State of California, have invented certain new and useful Improvement in Hubs and Axles, of which the following is a specification, reference being had therein to the accompanying drawings.

My invention relates to certain improvements in vehicle-hubs, having for its object to dispense with wedging the boxing or bushing in place in the hub and to prevent liability of the boxing or bushing turning when in use; and to these ends the invention consists in the novel combination and arrangement of parts, as hereinafter described, and illustrated in the accompanying drawings, in which—

Figure 1 is a transverse section of my improved vehicle-hub. Fig. 2 is a longitudinal view of the axle thereof, and Fig. 3 is a detached sectional view of the boxing or bushing. Fig. 4 is a detached perspective view of the box or bushing.

In the embodiment of my invention I provide bushing or boxing A, in its general outline tapering and adapted to fit in the hub B, of usual construction. The bushing or boxing A is provided at its larger or inner end with a rectangular shoulder or enlargement $a$, adapted to fit into a corresponding recess $b$ at the inner end of the bore of the hub to secure the bushing or boxing in place against turning. The smaller end of the boxing or bushing A has screwed upon it an annular nut $c$, holding the shoulder or enlargement $a$ tightly in its recess, said nut having, preferably, a beveled periphery, as at $c'$, facing a corresponding surface $c^2$ at the outer end of the bore of the hub.

C is the axle, having its arm passing through the boxing and terminating in a screw-threaded projection fitted with a nut $d$, holding the hub upon the axle-arm and said axle also having at the inner end of its arm a circular collar $d'$, entering corresponding recess $d^2$ in the boxing or bushing A. Thus constructed it is obvious that it obviates the necessity as heretofore practiced of driving or wedging the bushing or boxing into the hub and also prevents the liability of the boxing or bushing turning in the hub.

Having thus fully described my invention, I claim—

The combination of the axle having at the inner end of its arm a circular shoulder, the bushing or boxing having at its inner end a rectangular shoulder or enlargement and upon its outer end a screw-threaded surface fitted with an annular nut having an inner beveled surface and the hub adapted to receive said rectangular shoulder or enlargement and said annular nut, and said boxing or bushing being adapted to receive the annular nut on said axle, substantially as set forth.

In testimony whereof I affix my signature in presence of two witnesses.

WILLIAM W. FLEWELLING.

Witnesses:
W. S. HOPKINS,
B. M. SHANNON.